United States Patent

[11] 3,577,181

[72] Inventor Erwin F. Belohoubek
Kendall Park, N.J.
[21] Appl. No. 799,019
[22] Filed Feb. 13, 1969
[45] Patented May 4, 1971
[73] Assignee RCA Corporation

[54] TRANSISTOR PACKAGE FOR MICROWAVE STRIPLINE CIRCUITS
3 Claims, 3 Drawing Figs.

[52] U.S. Cl. .................................................... 333/84,
330/38, 330/56
[51] Int. Cl. .................................................... H01p 3/08
[50] Field of Search ........................................ 333/84;
317/101; 330/53, 54, 56, 66, 38; 331/101

[56] References Cited

UNITED STATES PATENTS 3,428,911 2/1969 Hambleton .................. 333/84X

OTHER REFERENCES

" On Measurements of Microstrip Properties" Seckelmann, The Microwave Journal, January 1968; pages 61— 64

*Primary Examiner*—Herman Karl Saalbach
*Assistant Examiner*—Marvin Nussbaum
*Attorney*—Glenn H. Bruestle

ABSTRACT: Package for mounting a transistor in a microwave stripline circuit comprising a metal base member, means disposed on the base member for grounding the emitter or base electrode of the transistor, and segments of low impedance microwave transmission lines disposed adjacent the grounding means, one of these including a ceramic core having both good dielectric and good heat conducting properties and being adapted to support the transistor and connect it to an RF output circuit. The other segment is adapted to electrically connect the transistor to an RF input circuit.

INVENTOR
ERWIN F. BELOHOUBEK

BY W. S. Hill
Agent

TRANSISTOR PACKAGE FOR MICROWAVE STRIPLINE CIRCUITS

The invention herein described was made in the course of, or under contract with the Air Force.

BACKGROUND OF THE INVENTION

Many types of transistor packages that have previously been used in microwave stripline circuits have not been designed especially for this use. In some cases they have been designed for use in circuits operating at medium radio frequencies and with transistors that were not designed to minimize parasitic reactances.

Some of the package types that have been used in stripline circuits are the JEDEC TO–5 and TO–39 can-on-header types with leads passing through the header; the JEDEC TO–60 which has a can mounted on a heavy metal stud; the molded silicone plastic type with isolated electrodes; and hermetic ceramic-to-metal packages with radial leads. Of these package types, only the last-mentioned have been especially designed for stripline use. Although the radial lead packages offer the best performance capabilities at high frequencies, all types suffer, in general, from the presence of undesirable parasitic reactances, insufficient decoupling between input and output circuits and RF mismatches at the connection pods. These effects become especially serious for frequencies above 1 GHZ.

SUMMARY OF THE INVENTION

The present invention comprises an improved device for mounting a transistor in a microwave stripline circuit, comprising a metal base member, means on the base member for grounding either the emitter or base electrode of the transistor, and a first segment of low impedance microwave transmission line mounted on the base member adjacent to the grounding means, for supporting the transistor and for connecting it to an RF output circuit. This segment includes a ceramic core having both good dielectric and good heat conducting properties. A second segment of low impedance microwave transmission line is adapted to electrically connect an RF input circuit to the transistor.

THE DRAWING

DESCRIPTION OF PREFERRED EMBODIMENT

Figure 1:
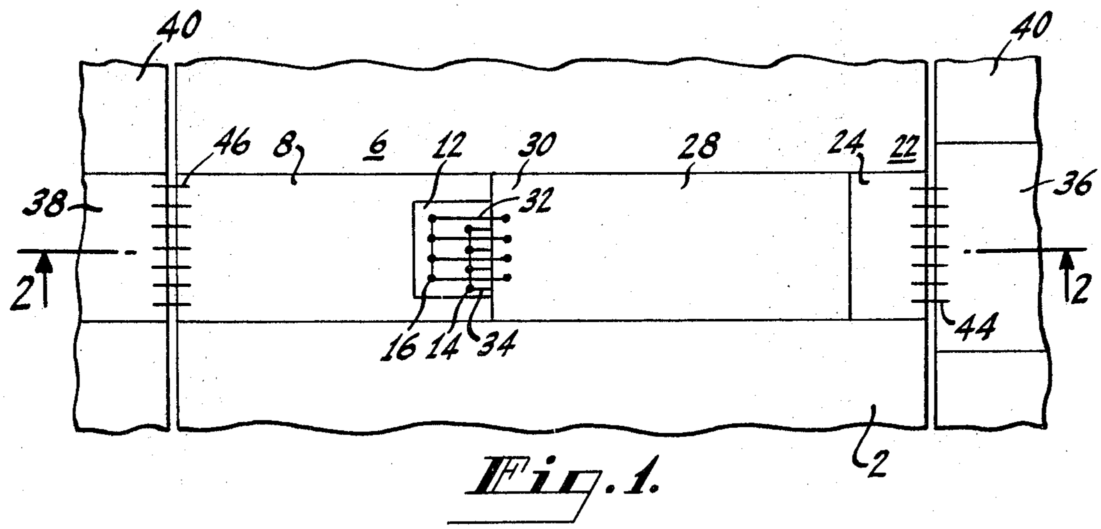
FIG. 1 is a top plan view of a device of the present invention connected in a microwave stripline circuit.
Figure 2:
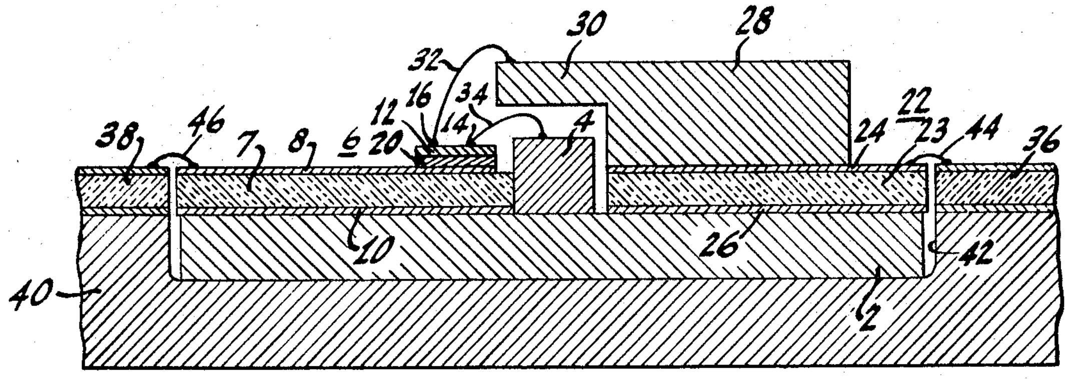
FIG. 2 is a cross section view taken along the line 2–2 of FIG. 1.

A device in accordance with the present invention comprises a substrate 2 which may be composed of molybdenum or other metal. Centrally disposed on the substrate 2 is a pedestal member 4 (FIG. 2) which may be of any metal. It may be an integral part of the same piece of metal as the substrate 2.

Positioned on one side of the pedestal 4 is a first segment 6 of low impedance microwave transmission line. It is composed of a ceramic core 7 which has both good dielectric and good heat conducting properties. The ceramic may be beryllium oxide, for example. The ceramic core 7 has a top layer of metal 8 and a bottom layer of metal 10. These metal layers may be molybdenum-manganese plated with gold, for example. The bottom layer of metal 10 is brazed to the top surface of the substrate 2.

Mounted on the top surface 8 of the segment 6 along an edge thereof adjacent the pedestal 4, is a semiconductor device 12 such as a transistor. The transistor has emitter and base electrodes 14 and 16, respectively, on the top surface thereof. The bottom metallized surface 20 of the transistor serves as a collector electrode connection and is soldered to the top metallized surface 8 of the ceramic core 7.

A second segment of low impedance microwave transmission line 22 having a ceramic core 23 and having a top metal layer 24 and a bottom layer 26 is brazed to the top surface of the substrate 2 on the side of pedestal 4 opposite the first transmission line segment 6.

Brazed to the top surface layer 24 of the transmission line segment 22 is a metal block 28 having an extended lip 30 which overhangs the pedestal 4. One or more connecting wires 32 extend from the lip 30 to the base electrode 16 of the transistor 12. A part of the block 28 with the lip 30, together with an adjacent surface of the pedestal 4, function as a parallel plate transmission line for electrically connecting the transmission line segment 22 to the transistor via the wires 32 and 34.

The emitter electrode 14 of the transistor is connected to the pedestal 4 with wires 34. The pedestal 4 functions as a ground connection. It will be understood that either the emitter electrode 14 or the base electrode 16 may be grounded depending upon the circuit in which the device is being used. Thus, the connections of the wires 32 and 34 may be reversed. It will also be understood that the wires 32 and 34 may be either single or multiple and may be strips instead of wires.

The transistor mounting device which has been described may be connected to a stripline circuit as follows. The circuit may includes an input portion 36 and an output portion 38 each consisting of metallized ceramic similar to the ceramic strips 6 and 22. The ceramic does not need to have good heat conducting properties. The circuit portions are mounted on a metal plate 40 having a recess 42 in which the mounting device is seated. The dimensions of the recess and of the substrate 2 are chosen so that the ends of the strips 6 and 22 will match the ends of the circuit portions 36 and 38.

A small gap is left between the end of the input circuit portion 36 and the line segment 22. This gap is bridged with a plurality of wires or strips 44. A similar gap is left between the output circuit portion 38 and the line segment 6. A plurality of wires 46 bridges the gap.

Figure 3:
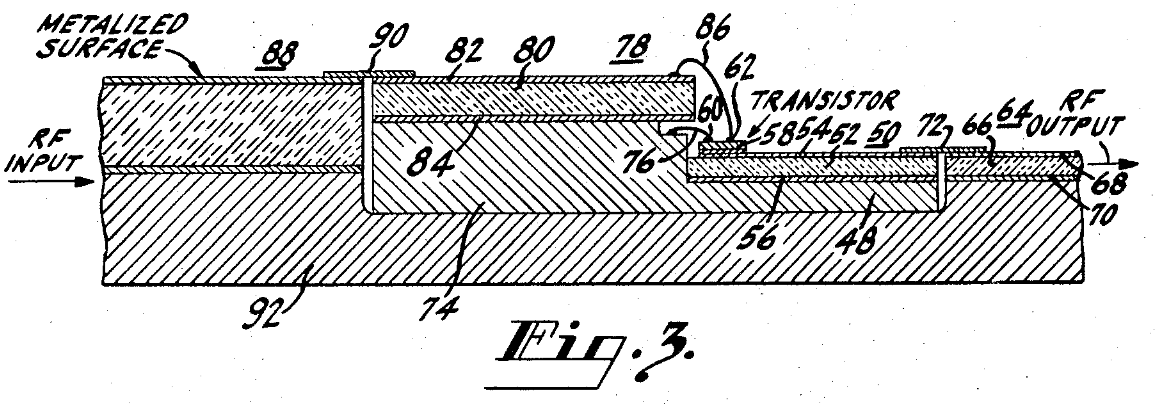
FIG. 3 is a cross section view of a second embodiment of a device of the present invention.

A second embodiment of the device is shown in FIG. 3. This embodiment includes a metal substrate 48 on which is mounted a segment of low impedance transmission line 50. The line segment 50 comprises a core composed of a strip of ceramic material 52 which may be of beryllium oxide or some other ceramic having both good dielectric and good heat conducting properties, and top and bottom metal layers 54 and 56, respectively.

The transmission line segment 50 serves as a support for the transistor 58 having emitter electrode 60 and base electrode 62. It also connects the transistor to an RF output circuit 64 which comprises a core strip 66 of a ceramic material and top and bottom metal layers 68 and 70, respectively. A metal strip or wires 72 bridges the gap between the line segment 50 and the output circuit 64.

An elevated portion 74 of the substrate 48 is disposed adjacent an end of the transmission line segment 50. The portion 74 functions as a grounding means for either the emitter or base electrode of the transistor 58. A wire or wires 76 connects the grounded electrode of the transistor (illustrated as emitter electrode 60) to the portion 74. The portion 74 also supports a second segment 78 of very low impedance microwave transmission line composed of a ceramic core strip 80 and top and bottom metal layers 82 and 84, respectively. The transmission line segment 78 can comprise a high dielectric solid material with metallized surfaces or a metallized thin film dielectric. The objective is to transform the very low impedance of the transistor to a higher real impedance.

The top metal layer 82 of the line segment 78 is connected to the ungrounded emitter or base electrode of transistor 58 by means of a wire or wires 86.

The line segment 78 is also electrically connected to an RF input circuit 88 by wires or strips 90 and the metal portion 74, support member 48, and the support member 92 which is of metal and which supports the circuits and the device.

The microwave input and output circuits need not have ceramic cores. They can be any type of microstrip or stripline circuit.

An advantage of the transistor packages of the present invention is their small size especially suited for microwave electronic circuits. A further advantage is that these packages introduce relatively small parasitic reactances. They also readily permit paralleling of several transistor packages.

A particular noteworthy feature of these transistor packages is that the mounting means for the transistor constitutes a microwave transmission line that has good heat conducting properties.

I claim:

1. A mounted transistor device in a microstripline circuit comprising;

a metal base member, a metal block on said base member for grounding the emitter or base electrode of said transistor and a ground connection from one of said emitter or base electrodes to said block, a first segment of low impedance microwave transmission line mounted on said base member on one side of said metal block, said line comprising a ceramic core member having both good dielectric and good heat conducting properties and electrically conducting films on opposed surfaces of said core member, a transistor mounted on said segment with its collector electrode soldered to one of said conducting films, and a second segment of low impedance microwave transmission line comprising a ceramic core member with electrically conducting films on opposed surfaces thereof disposed between and connected to an RF input circuit and to the emitter and base electrodes of said transistor.

2. A device for mounting a transistor in a microstripline circuit comprising:

a metal base member, grounding means on said base member for grounding the emitter or base electrode of said transistor, a first segment of low impedance microwave transmission line comprising a strip of ceramic material having electrically conducting films on opposed surfaces thereof, mounted on said base member on one side of said grounding means, said first segment being adapted to be electrically connected to an RF input circuit, means including said grounding means functioning as a transmission line for electrically connecting said first line segment to the emitter and base electrodes of said transistor, and a second segment of low impedance microwave transmission line for supporting said transistor, comprising a strip of ceramic material having both good dielectric and good heat conducting properties and having electrically conducting films on opposed surfaces thereof, mounted on said base member on the opposite side of said grounding means, and being adapted to be electrically connected to an RF output circuit.

3. A mounted transistor device in a microstripline circuit comprising:

a metal base member, a first segment of low impedance microwave transmission line mounted on said base member, said line segment comprising a ceramic core member having both good dielectric and good heat conducting properties and metal films on opposing surfaces of said core member, said segment being adapted to be connected to an RF output circuit, a transistor mounted on one of said metal films with its collector electrode soldered thereto, a metal block on said base member adjacent said first line segment for grounding the emitter or base electrode of said transistor and an electrical connection from either said emitter or base electrode to said block, a second segment of low impedance microwave transmission line comprising a ceramic core member with metal films on opposing surfaces thereof mounted upon said metal block and adapted to be electrically connected to an RF input circuit, and means connecting said second line segment to the emitter and base electrodes of said transistor.